A. J. THOMPSON.
PLOW.
APPLICATION FILED JUNE 17, 1918.
1,283,444.
Patented Oct. 29, 1918.
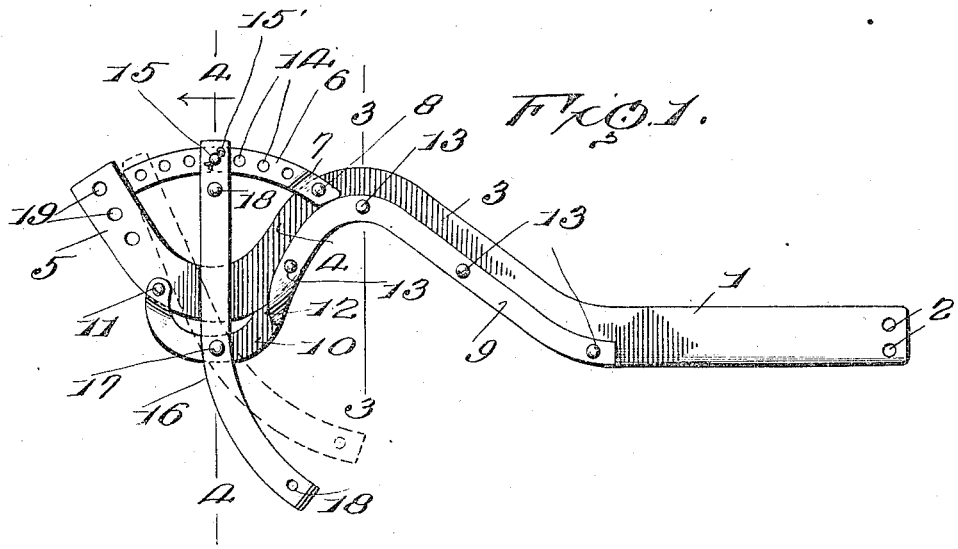
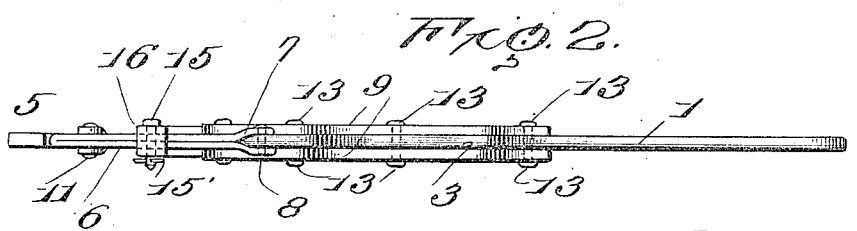
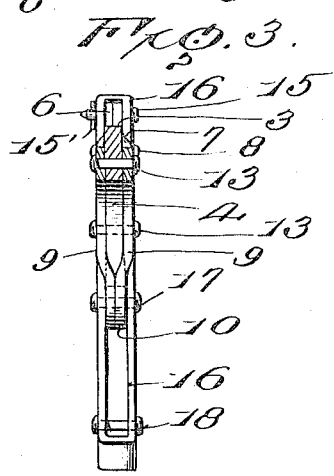
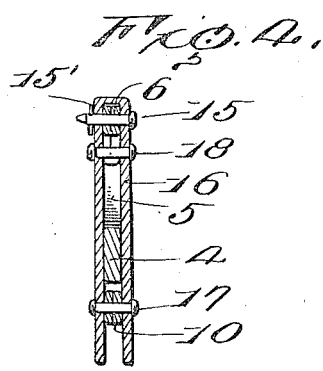
Inventor
A. J. Thompson
By
Lacey & Lacey, Attorneys

UNITED STATES PATENT OFFICE.

ANDREW J. THOMPSON, OF FAIRBURN, GEORGIA.

PLOW.

1,283,444.

Specification of Letters Patent.

Patented Oct. 29, 1918.

Application filed June 17, 1918. Serial No. 240,473.

*To all whom it may concern:*

Be it known that I, ANDREW J. THOMPSON, a citizen of the United States, residing at Fairburn, in the county of Campbell and State of Georgia, have invented certain new and useful Improvements in Plows, of which the following is a specification.

My invention relates to plows and has for its object the provision of a strong, rigid construction of beam, and means whereby the blade may be easily adjusted so as to run at any desired angle to the surface of the ground.

The invention is illustrated in the accompanying drawings and consists in certain novel features which will be first fully described and then more particularly pointed out in the appended claims.

In the drawings—

Figure 1 is a side elevation of a plow beam and standard embodying my invention;

Fig. 2 is a plan view of the same;

Fig. 3 is a transverse section on the line 3—3 of Fig. 1;

Fig. 4 is a transverse section on the line 4—4 of Fig. 1.

The beam 1 will preferably be constructed of metal and is provided at its front end with openings 2 for the attachment of a clevis or other draft device. The forward extremity of the beam is a straight bar but near or at its longitudinal center the beam is carried upwardly and rearwardly, as shown at 3, and is then curved downwardly as at 4 and finally upwardly again as at 5, the portions 4 and 5 providing a saddle member which is bridged by an arched locking beam or bar 6. This locking bar or beam is preferably a light metal strap doubled on itself and having its extremities spaced slightly apart, as shown at 7, whereby they may fit over the edge of the beam and against the opposite sides of the same, a rivet 8 being inserted through the extremities of the locking bar and the beam so as to firmly secure the locking bar in place. The rear extremity of the bar may be brazed or otherwise fastened to the extremity of the beam if desired, but it is not necessary for it to be fastened and it may be free if preferred. To the sides of the beam, at the lower edge thereof, I secure the braces 9 which extend from the forward end of the upturned portion 3 and then down the front horn 4 of the saddle and turned under the saddle so as to meet below the same, as shown at 10, the rear portions of these bracing bars or straps being slightly spaced from the seat of the saddle and then brought up to the same with their extremities spaced to fit against the opposite sides of the rear horn 5 of the saddle. A rivet or bolt 11 is inserted through the rear extremities of the braces and through the saddle so as to secure the parts together. At the point 10, where the braces or straps are brought together below the saddle, they may be cut away so as to lie flush with the side face of the saddle and also provide a shoulder 12 which may form a stop to prevent the standard swinging to an excessively high degree in the event that the upper portion of the standard should be bent or broken. Rivets or belts 13 are provided to secure the straps to the side faces of the beam and it will be readily understood that by providing these bracing straps the rigidity of the beam is increased so that a comparatively light beam may be used without loss of strength. A series of perforations or openings 14 extend longitudinally of the locking bar 6 and a holding pin 15 is inserted through any one of these openings and similar openings in the upper end of the plow standard 16 so as to hold the standard in any set position, a key 15' being inserted through said pin to prevent its loss. The standard is composed of a metallic bar or strap having its ends brought together and its intermediate portion folded on itself so that a long narrow loop is provided to fit around the locking bar 6, the saddle, and the lower curved portion of the brace 9, a pivot 17 being inserted through the standard and the lower arcuate portion of the brace straps to mount the standard and permit its pivotal adjustment in the longitudinal plane of the plow. Rivets 18 are inserted through the standard near the upper and lower ends of the same so as to prevent separation of the branches of the standard. The blade or shovel is secured to the lower end of the standard in the usual manner.

The plow is drawn over the field in the usual manner and the standard is, of course, so shaped that its lower end is curved slightly forward to support the shovel or blade in an oblique position. Upon reference to the dotted lines in Fig. 1, it will be noted that the standard can be very readily swung about its pivotal support so as to bring the plow blade into nearly a horizontal position and may also be so adjusted that the blade will be perpendicular or approximately perpendicular. The adjustment of the standard may be changed in a very short period of time inasmuch as the only work required is to remove the pin 15 and then swing the standard to the desired position and again insert the pin 15. The formation of the several parts brings the pivot point of the standard very nearly in the direct line of the draft so that the pulling strain applied to the beam is transmitted directly to the standard and the blade, therefore, held to its work and drawn through the soil without loss of power. The rear horn 5 of the saddle is provided with perforations or openings 19 to permit the attachment of any well-known type of plow handles and high or low handles may be applied and used with equal facility. The plow is simple and inexpensive in its construction and possesses a high degree of rigidity so that it is efficient and durable.

Having thus described the invention, what is claimed as new is:

1. In a plow, the combination of a beam having its rear end forming a saddle and having an arched portion immediately in advance of the saddle, bracing straps secured to the arched portion of the beam along the lower edges thereof, said straps being brought together below the saddle and having their rear ends secured to the saddle, a standard pivotally mounted at the seat of the saddle, and means above the saddle for holding the standard in a set position.

2. A plow comprising a beam having a saddle-like rear portion and an arched portion immediately in advance of the saddle, a strap doubled upon itself and bridging the saddle and having its ends spaced apart to fit over and be secured to the beam, braces secured to the sides of the beam at the lower edge thereof and brought together below the saddle, a standard comprising a bar doubled upon itself to fit over the saddle portion of the beam, the locking bar and the lower rear portions of the braces, a pivot pin inserted through the saddle and through the said lower portions of the braces, and means engaging the standard and the locking bar to hold the standard in a set position.

In testimony whereof I affix my signature.

ANDREW J. THOMPSON. [L. s.]

Copies of this patent may be obtained for five cents each, by addressing the "Commissioner of Patents, Washington, D. C."